No. 677,110. Patented June 25, 1901.
B. A. BROOKS.
TYPE WRITING MACHINE.
(Application filed Apr. 26, 1894.)
(No Model.) 5 Sheets—Sheet 1.

Witnesses:
Thomas Livingston
W. Wilson

Inventor,
Byron A. Brooks

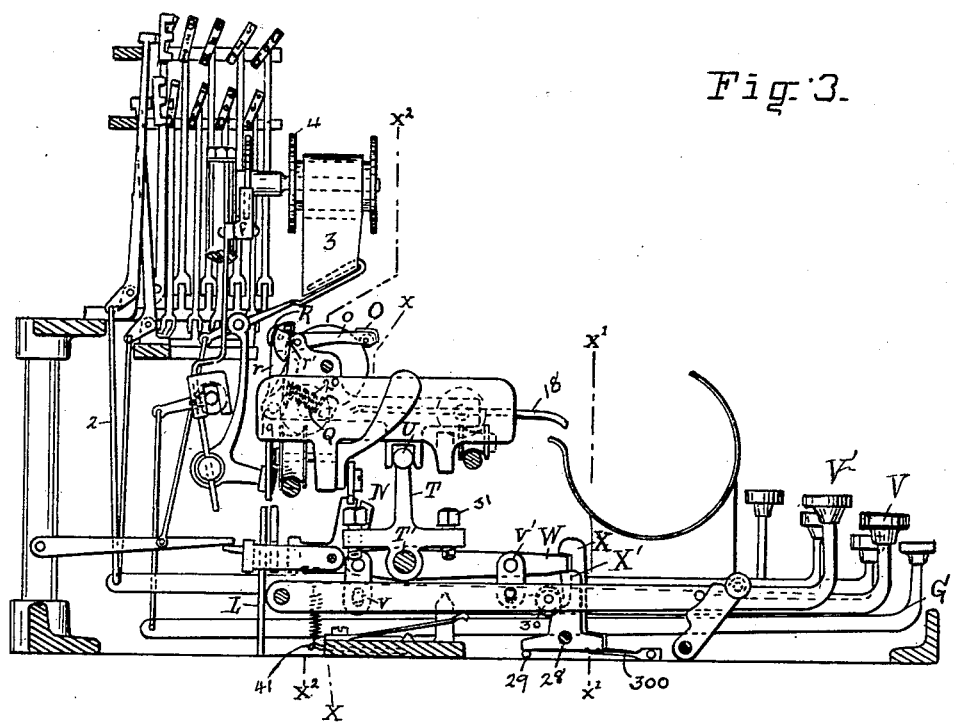

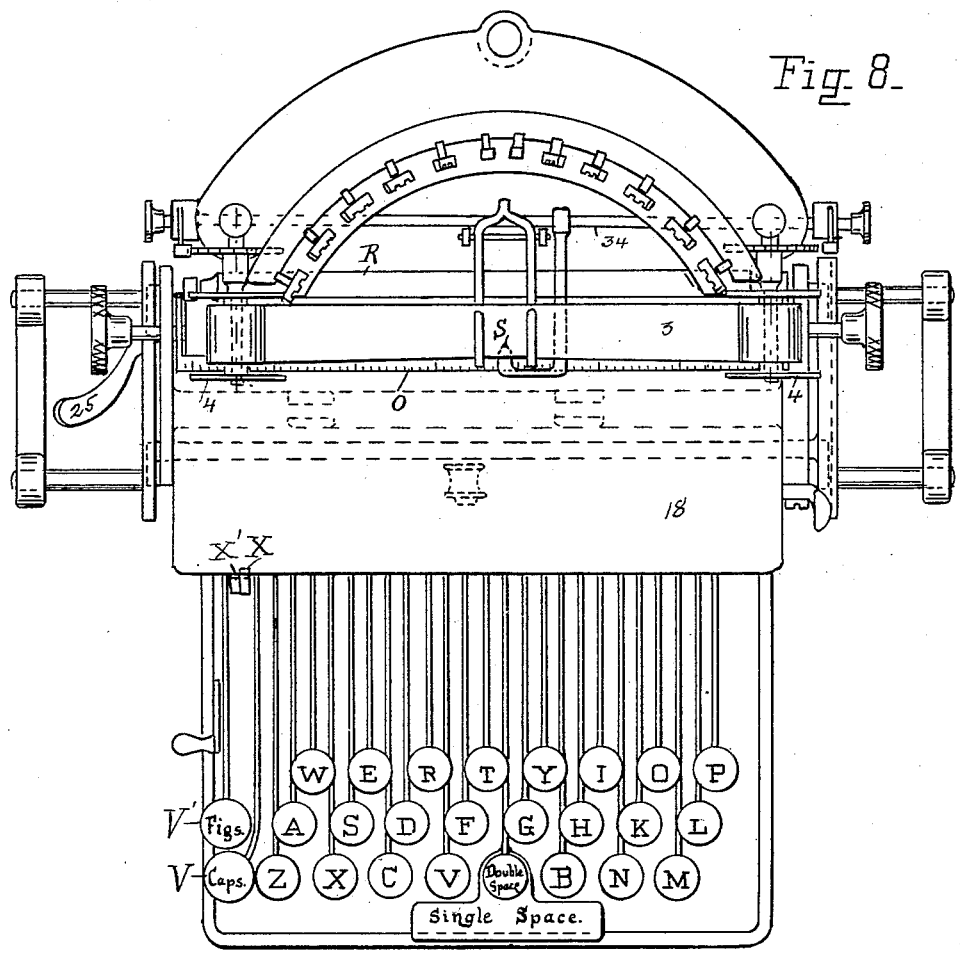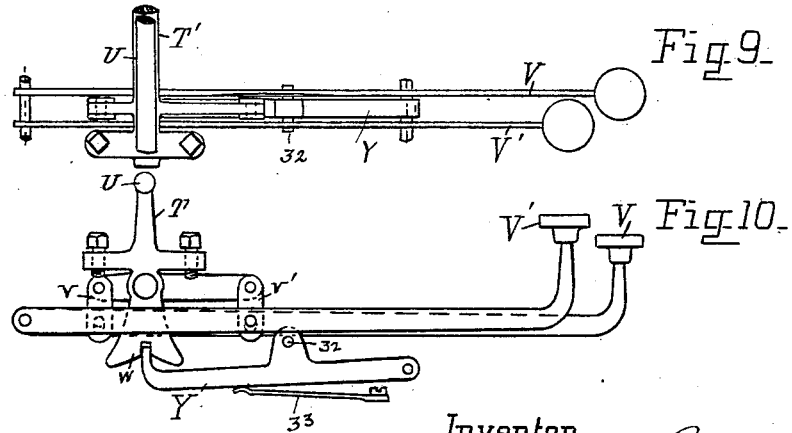

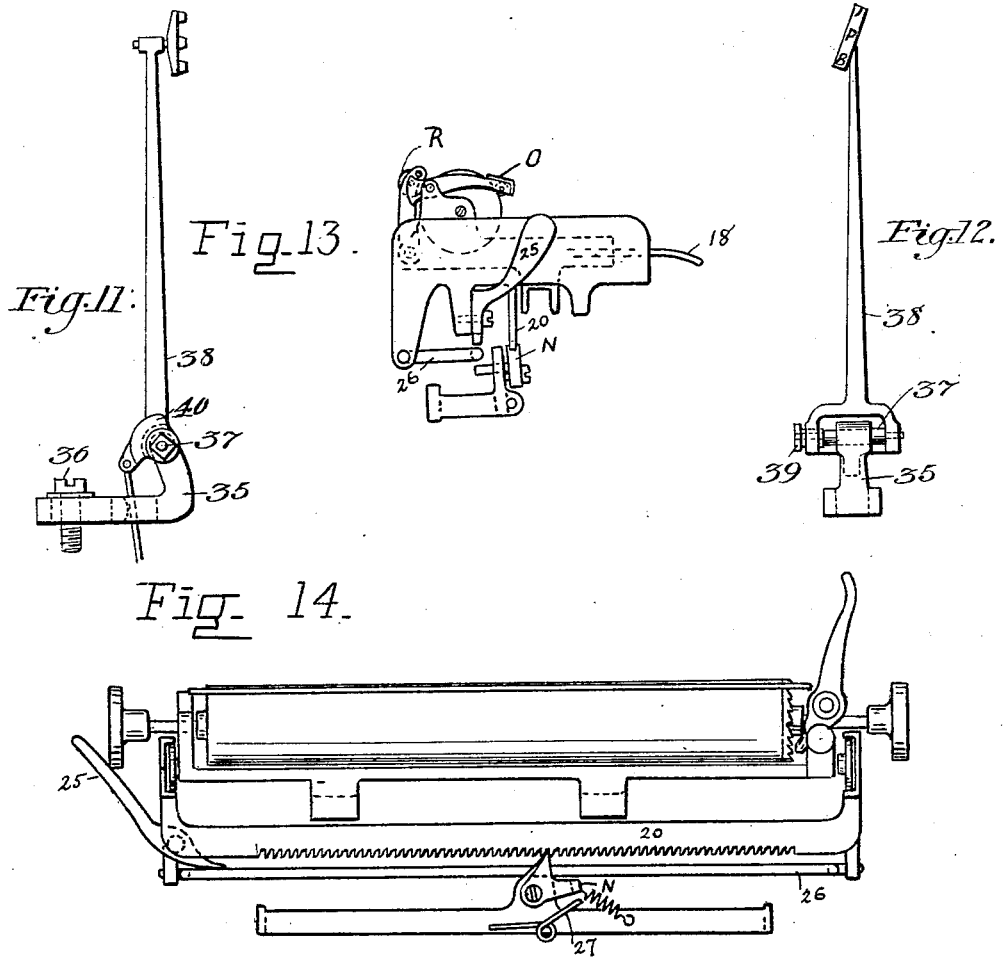

No. 677,110. Patented June 25, 1901.
B. A. BROOKS.
TYPE WRITING MACHINE.
(Application filed Apr. 26, 1894.)
(No Model.) 5 Sheets—Sheet 5.

WITNESSES:
C. E. Ashley
H. W. Lloyd

INVENTOR
Byron A. Brooks
By his Attorneys
Gifford & Price

UNITED STATES PATENT OFFICE.

BYRON A. BROOKS, OF BROOKLYN, NEW YORK, ASSIGNOR TO UNION TYPE-WRITER COMPANY, OF NEW JERSEY.

TYPE-WRITING MACHINE.

SPECIFICATION forming part of Letters Patent No. 677,110, dated June 25, 1901.

Application filed April 26, 1894. Serial No. 509,086. (No model.)

*To all whom it may concern:*

Be it known that I, BYRON A. BROOKS, a citizen of the United States, residing in the city of Brooklyn, county of Kings, and State of New York, have invented certain new and useful Improvements in Type-Writing Machines, of which the following is a specification.

My present invention consists of certain novel parts and combinations of parts, which will be pointed out in the claims concluding this specification.

The following is a description of the drawings accompanying this specification, in which similar letters and figures of reference indicate the same or corresponding parts in all the views.

Figure 1:
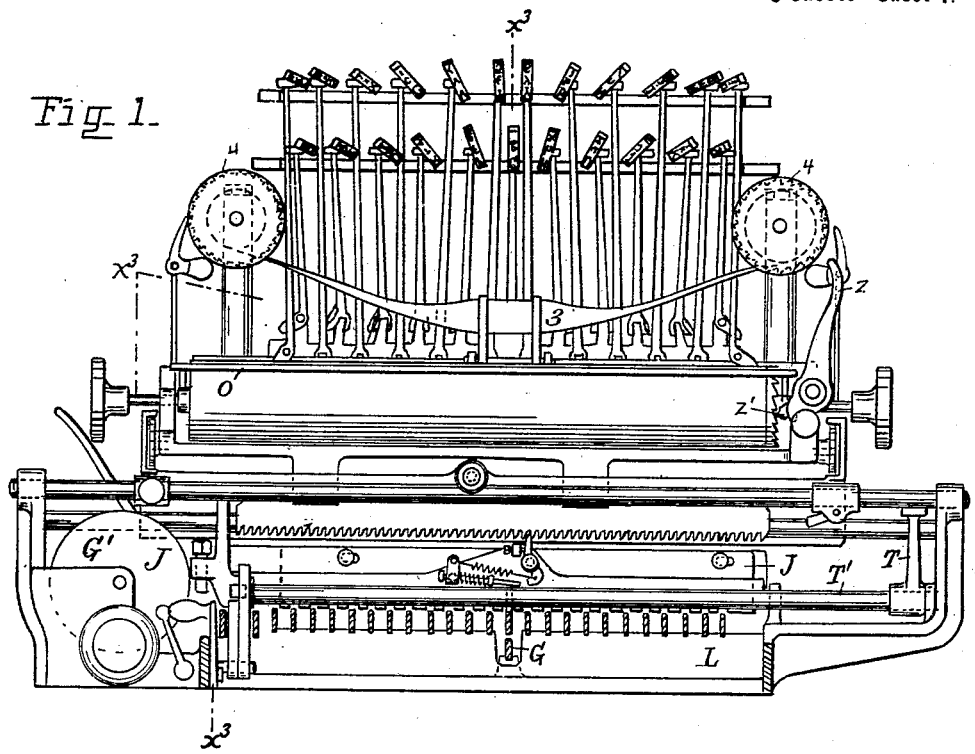
Figure 2:
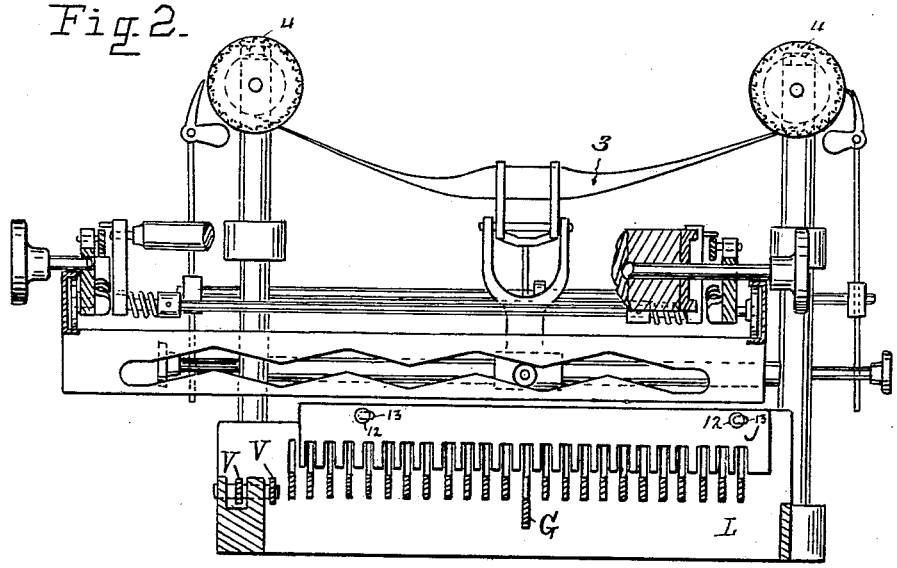
Figure 15:
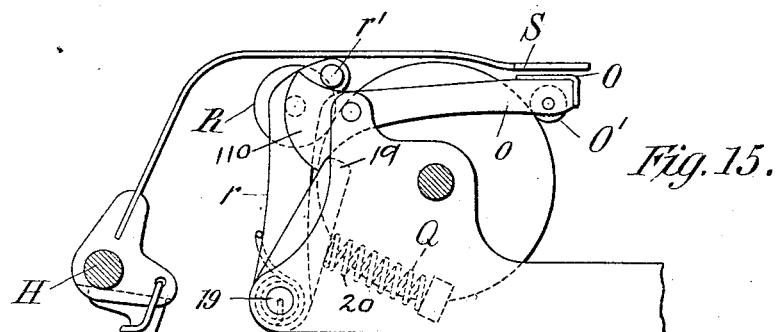
Figure 16:
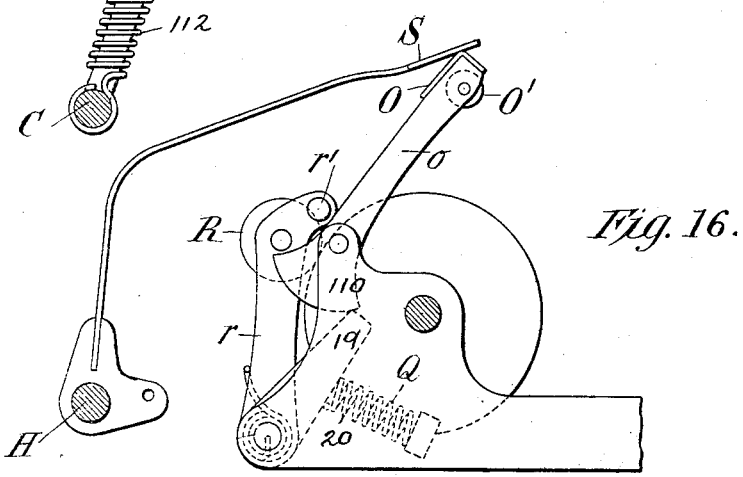
Figure 17:
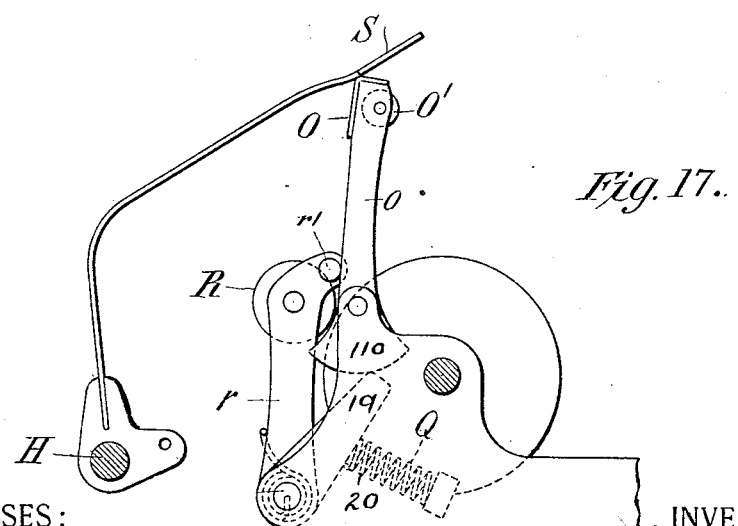

Figure 1 is a front and sectional view of a type-writing machine on the line $x'x'$ of Fig. 3. Fig. 2 is a section on the line $x^2 x^2$, Fig. 3. Fig. 3 is a section on the line $x^3 x^3$, Fig. 1, that portion of the frame which supports the type-bars being in section at about the center of the machine and half the type-bars being removed, the remainder of the frame being in section close to the side. Fig. 4 is a detail view of the universal bar, spacing mechanism, and ribbon-operating bar. Fig. 5 shows the scale and pressure-roll raised from the platen. Figs. 6 and 7 show spacing mechanism in different positions. Fig. 8 is a plan view of the machine, certain parts being omitted. Figs. 9 and 10 are plan and side views, respectively, of a modification of shifting-levers and attendant devices. Figs. 11 and 12 are detail views of the bar and hanger. Figs. 13 and 14 are detail views of mechanism for releasing the spacing mechanism. Figs. 15, 16, and 17 show the paper feeding and guiding devices in different positions.

The following is a description of the structure shown in the accompanying drawings, which illustrate a machine containing in the form at present preferred by me the several and separate features of invention; but various modifications and changes may be made without departing from the spirit of my invention and without exceeding the scope of the concluding claims.

The machine herein illustrated may be said to be a modification of and improvement on the machines heretofore described and patented by me in Letters Patent No. 454,845, dated June 30, 1891, and other patents of mine. In this machine the type-bars consist of bell-crank levers pivoted to suitable supports held in a stationary frame, each of said type-bars being provided with three types, which are severally brought to the printing-point by the vibration of the platen from its normal position to two new printing positions, said normal position being in this case intermediate between said shifted positions. These type-bars are caused to print by a link 2, connecting the ends of the key-levers and the shorter limb of the bell-crank type-bars. An inking-ribbon 3, carried on spools 4, is interposed between the types and platen.

Referring to Figs. 3, 5, and 8, 18 is an apron for guiding the paper. O is the scale, which presses the paper against the platen, and R is a feed-roll for feeding the paper. The scale O is also provided with a pressure-roll O'. The scale O is carried by arm o, pivoted to projections on the ends of the carriage and provided at one end with cam-surfaces. 19 is an arm controlled by a spring 20, by which it is pressed against a concave cam-surface 110 when the scale and frame are in the position shown in Fig. 3 and by which it is pressed against a convex cam-surface 110 when the scale and frame are in the position shown in Fig. 5, in the former case the arm 19 operating to press the scale against the platen and in the latter to keep it elevated above the platen. When the scale is in the position shown in Fig. 5, it presses the feed-roller R away from the surface of the platen by contact with and pressure against pin $r'$, attached to the frame which carries said feed-roller.

Referring to Fig. 8, it will be seen that the machine is provided with two space-keys, one marked "Single space" and the other marked "Double space." The double-space key is arranged above the single-space key, so that when the former is depressed the latter will be thereby also depressed.

Fig. 4 shows a top view of the mechanism by means of which the spacing-dogs are operated, and Figs. 6 and 7 show a side view, the same including the spacing-rack 20, which is omitted in Fig. 4. The rack 20 is attached to the carriage, which is drawn to the left by a spring G', Fig. 1, and is fed forward under the control of a fast and a loose dog in the ordinary manner. When it is desired to feed the carriage a double space, so that the last letter of a word may be printed and the space obtained simultaneously, the double-space key and the letter-key are both depressed and the end 21 of the double-space key-lever throws the stop-pin 22 up and out of engagement with the lower end of the loose dog N, which then, under the influence of a spiral spring 23, causes the loose dog to swing back two teeth, thus obtaining a double space. As the single-space lever is depressed automatically when the double-space key is operated, the feeding operation in other respects is the same as usual.

Figs. 13 and 14 show, respectively, end and front views of the mechanism by means of which the feeding-dogs are disengaged from the feeding-rack, which permits the carriage to be moved back. The feeding-dogs in these figures differ somewhat in form from those shown in Figs. 4, 6, and 7; but the principle of operation is the same. 25 is a lever which when operated depresses a swinging rod 26, which strikes the tail of the loose dog N, throwing it down and out of engagement with the teeth of the spacing-rack 20. 27 is a spring which is thereby depressed, and the carriage is free to move in either direction. The spring 27 acts normally as a stop to limit the downward motion of the loose dog N. This lever 25 is so formed and arranged that pressure against it in the direction of the return motion of the carriage automatically unlocks the same, and the platen is thereby returned without changing the direction of the force applied to unlock it. The platen occupies three printing positions transverse to the line of print, and in each of these positions it is securely locked. T, Fig. 3, is a lever rigidly attached to a rock-shaft T' or a stud. There are two levers T, one at each side of the machine, connected by a rod U, which engages in a fork attached to the frame of the platen-carriage. W is a lever attached to the rock-shaft T'. $v$ $v'$ are links, each attached to a shifting key-lever V and V'. When one of these shifting-levers is depressed, the rock-shaft T' and the lever T are rocked in one direction or the other to shift the platen to its new printing position. X and X' are stops for locking-levers, the former normally projecting over the top of an extension of the lever W and the latter normally standing beneath said projection. These locking-levers X and X' are pivoted at 28 and are each normally held forward against a stop 29 by means of spring 300. The links V and V' connect with their respective shifting-levers by means of pins working in slots, so that there is a certain amount of lost motion between the two. When one of the shifting-levers—as V, for example—is depressed, a cam 30, attached thereto, impinges against the side of the locking-lever X and throws it back, so as to unlock lever W, and then said shifting-lever continuing its motion rocks the lever T and shifts the platen backward until one of the stops 31 strikes against a projection on the frame of the machine. When the shifting key-lever V is released, the lever T is returned to its normal position under the influence of a spring or springs (not shown) until the lever W strikes the stop or locking-lever X' when the locking-lever X returns to its normal position and the platen is held in its central printing location.

Figs. 9 and 10 show another form of locking device in top and side view, also effecting the positive locking of the platen in its normal printing position. When the shifting key-lever V or V' is depressed, it comes in contact with a pin 32 upon a pivoted arm Y, thereby depressing said arm and withdrawing its hooked end from a depression in an extension of the lever T, unlocking said lever, so that by the continued downward motion of the shifting key-lever the platen-carriage is shifted, as before described. When the shifting key-lever is released, the pivoted arm Y, under the influence of a spring 33, rises and, impinging on one of the cam-surfaces of said extension $w$, aids the spring or springs (not shown) in returning the platen to its normal position, when the hook enters the depression and holds the platen in its normal position.

Referring to Figs. 8, 15, 16, and 17, S is a pointer resting on top of the scale and the platen. This pointer is attached to a rod or pivot 34 and pressed against the platen by a coiled spring 112, Fig. 15. This pointer remains stationary relative to the travel of the carriage, but may be swung up with the scale and is always pointing at the printing-point on the platen. It also operates as a friction device to press the paper against the platen, extending, as it does, at right angles to the line of print and being always at the printing-point. It is useful as a friction device, especially when narrow sheets or letters or postal cards are in the machine.

Figs. 11 and 12 show a type-bar and hanger. 35 is a hanger made of a solid and undivided piece of metal attached to the frame of the machine by a screw 36. 37 is a pivot rigidly attached to said hanger. The type-bar 38 is forked at its lower end and is journaled on said pivot. One of the limbs of the fork is reamed out larger than is the other and receives a set-screw 39, provided with a socket, into which the diminished end of the pivot is journaled. This furnishes a means for readily taking up wear. 40 is a shoulder (not shown in Fig. 12) integral with the type-bar for increasing its rigidity.

Many of the details shown in the drawings are not specifically described, because they are devices well known in the art, and a detail description thereof is not necessary to enable others skilled therein to practice my invention or to construct the machine illustrated and described.

In the foregoing specification I have referred to some of the modifications which might be adopted in the practice of my invention; but I have not endeavored to specify all the modifications which might be employed, the object of this specification being to instruct persons skilled in the art to which my invention relates to make and use the same in the form at present preferred by me, reference being had to the accompanying drawings; but I desire it to be distinctly understood that my invention is not limited to the precise devices or combinations of devices shown, as various modifications may be adopted without departing from the spirit of my invention and without exceeding the scope of the concluding claims. In the claims the omission of an element or the omission of reference to the detail features of the elements mentioned is intended to be a formal declaration of the fact that the omitted elements or features are not essential to the inventions therein severally covered.

Having thus fully described my invention, I claim as new and desire to secure by Letters Patent—

1. In a type-writing machine, the combination with a platen, of a feed-roll, scale and pointer, and connections between the feed-roll scale and pointer whereby they may be moved to or from the platen together.

2. In a type-writing machine the combination with a platen, of a feed-roll, scale and pointer, and connections between the feed-roll, scale and pointer whereby they may be moved to or from the platen together, and a spring adapted to hold said scale and feed-roll in either their normal or raised positions.

3. The combination with the platen, of a feed-roll and scale and connections between them inoperative to move the feed-roll during the first part of the movement of the scale and operative to move the feed-roll from the platen during the latter part of the movement of the scale.

4. The combination with the platen, of a feed-roll, a scale adapted to be raised from the platen for the insertion of paper without moving the feed-roll, and a spring adapted to maintain the scale in either its normal or raised positions.

5. The combination of a platen, a feed-roll and a scale movable to engage the feed-roll to hold it either raised from or in engagement with the platen, said scale being inoperative to affect the feed-roll except at the extremities of its movement, and a spring adapted to hold said scale at both extreme positions.

6. The combination of a platen, a feed-roll, a scale a spring-pressed pointer and type-bars adapted to strike on the upper side of said platen between said scale and feed-roll, said pointer being above the scale and raised from the platen by the raising of the scale.

7. The combination of a platen free to rotate in either direction, a lever for drawing the platen-carriage back, a pawl operated by said lever normally out of engagement with a ratchet on said platen, all combined and arranged so that the platen is rotated and returned to its initial position by continuous pressure on said lever in one direction, a feed-roll and a friction-roll for holding the platen in its normal position.

8. In a type-writing machine, the combination of a vibrating and longitudinally-moving platen, shifting mechanism by which it is caused to vibrate in either direction from the central and normal position, spring mechanism for returning it to its normal position, a shifting pin, a doubled-faced cam and spring-pressed lever, mechanism for arresting it at its normal position and holding it there.

9. In a type-writing machine the combination of a vibrating and a longitudinally-traveling paper-carriage, a shifting key-lever whereby said carriage is vibrated, a cam and a lever coöperating with said cam whereby the carriage is returned to and held in its normal position.

BYRON A. BROOKS.

Witnesses:
J. EDGAR BULL,
M. WILSON.